Jan. 11, 1966 J. KRICKSFELD ET AL 3,228,135
FISH STRIKE SIGNALLING DEVICE
Filed April 21, 1964
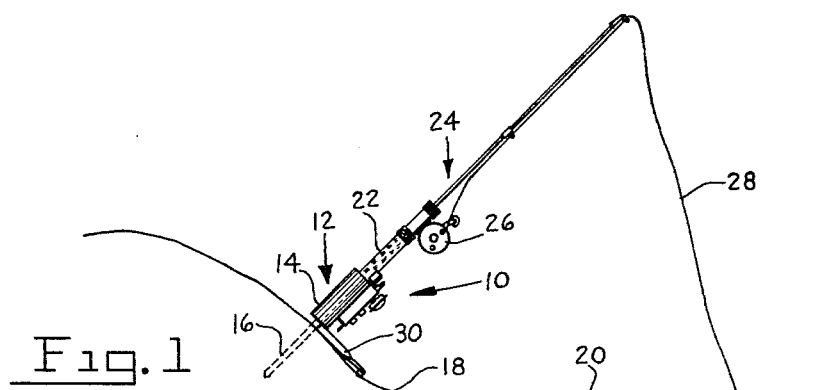
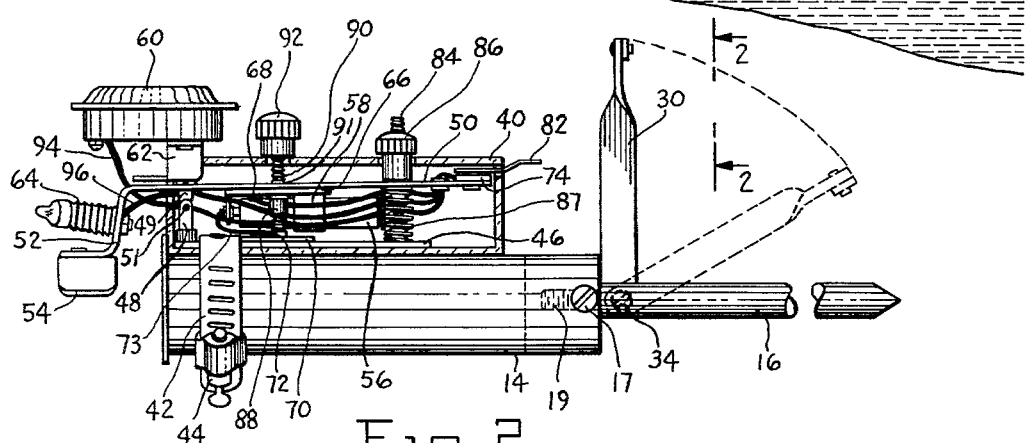
INVENTOR.
JULIUS KRICKSFELD
SOL WASSERMAN
BY
ATTORNEY

United States Patent Office

3,228,135
Patented Jan. 11, 1966

3,228,135
FISH STRIKE SIGNALLING DEVICE
Julius Kricksfeld, 2947 W. 25th St., and Sol Wasserman, 2829 W. 27th St., both of Brooklyn, N.Y.
Filed Apr. 21, 1964, Ser. No. 361,373
8 Claims. (Cl. 43—17)

The present invention relates to a new and novel signalling device which will indicate the presence of a fish.

The majority of fishermen seek relaxation from the sport of fishing; however, they do not find the time they spend anxiously awaiting a strike to be part of the leisure and relaxation they seek. Therefore, fishermen who stake a fishing rod, or a plurality of fishing rods, into the ground would prefer not to have to constantly watch their rods to ascertain whether or not there is a fish on the line. It is therefore the principal object of the invention to provide a fish strike signalling device which indicates to the fisherman that a strike has been made.

It is another object of the present invention to provide a signalling device which indicates when a small bait stealer is present on the line, so as to avoid fishing with an unbaited line.

It is a further object of the present invention to provide a fish strike signalling device which is audible, visible or both.

It is yet another object of the present invention to provide a fish strike signalling device which is easily adjustable to compensate for currents, tides, winds, size of pole or size of fish.

It is still another object of the present invention to provide a fish strike signalling device which is tilt-proof so as to prevent the rod, and more particularly the reel, from falling into the sand, dirt, etc.

It is another object of the present invention to provide a fish striking signalling device which is operable with either a spinning or conventional reel and which is independent of the line, so that the line will not be frayed or cut.

It is yet a further object of the present invention to provide a fish strike signalling device which is operable be used for fishing from the shore, from a jetty or from a pier.

These and other objects of the present invention will become more apparent when considered in conjunction with the accompanying drawings wherein:

FIGURE 1 is an elevational side view depicting the fish strike signalling device of the present invention in conjunction with a fishing rod, reel and sand spike.

FIGURE 2 is a partial side sectional view of the present invention depicting the details thereof.

FIGURE 2A is a partial front view of the anti-tilt device of the present invention taken on the line 2—2 of FIGURE 2.

FIGURE 3 is a top view of the present invention, as depicted by FIGURE 2, with the top part of the casing removed.

FIGURE 4 is a side elevational view of a clamping device in accordance with the present invention, whereby said device can be secured to a pier or the like.

The invention will now be described with reference to the drawings wherein FIGURE 1 depicts the fish strike signalling device of the present invention indicated by the numeral 10. The signalling device 10 is attached to a sand spike 12 in a manner to be described hereinafter. The spike 12 has a tubular portion 14 and a prong 16 by which it is inserted into the ground 18 and is preferably inclined towards the water 20. The handle 22 of a fishing pole 24 having a reel 26 and a fishing line 28, is inserted into the tubular portion 14 of the spike 12. A brace 30, having a cross member 31 pivotally secured at the outer end thereof by a rivet or stud 32, as seen in FIGURE 2A, has its inner end pivotally attached to the prong 16 by a screw 34, said brace preventing the spike 12, the pole 24 and the signalling device 10 from tilting over and falling upon the ground.

Referring now to FIGURE 2, the fish strike signalling device 10 includes a casing 40 which may be made of metal, plastic or any other suitable material. The signalling device is attached to the tubular portion 14 of the spike 12 by means of an adjustable clamp 42 which passes through two slots (not shown) in the bottom of the casing 40. A worm gear 44, attached to the clamp 42, serves to tighten the clamp around the tubular portion, thereby securely anchoring said signalling device with respect to said tubular portion.

A mounting plate 46, preferably made of metal and having a post 48 connected thereto at the top thereof, is secured to the bottom of the casing 40. Another mounting plate 50, made of metal, is pivotally connected about the post 48 by means of a second post 49 secured to the underside of said plate at the top thereof; said posts having a conventional tongue and groove connection where the post 48 has a groove (not shown) at the top thereof, and the post 49 has a tongue at the bottom thereof which projects into said groove and is pivotally secured therein by a stud or pin 51 projecting laterally therethrough. The flange 52 of the mounting plate 50 has a curved member 54 secured thereto, and said curved member is positioned slightly above and directly over the opening of the tubular portion 14 and is adapted to have the curved handle 22 of the fishing pole 24 abut it.

A penlight battery 56 is mounted on the underside of the mounting plate 50 by means of a bracket 58. A bracket 62 connected to the horn 60 serves to secure said horn with respect to the plate 50 by means of a threaded bore therein (not shown) which threadedly engages a threaded shank (not shown) at the top of the post 49 and a light 64 is mounted on the flange 52 of the plate 50. A mounting strip 66, made of an electrically non-conducting material and having a terminal 68, is mounted on the underside of the plate 50, and a mounting strip 70, made of an electrically non-conducting material and having a terminal 72, is mounted on the top side of the plate 46. A third mounting strip 74 of dielectric material is mounted on the top side of the plate 50 at the lower end thereof, said strip having terminal 76, 78 and 80; the terminal 80 being connected to a pivotable switching lever 82. A threaded shaft 84 is connected to the top side of the mounting plate 46 and projects through an opening (not shown) in the plate 50. A threaded plastic nut 86 engages the threaded shaft 84 at the top side of the plate 50 and a spring 87 is placed on the threaded shaft between the underside of the plate 50 and the top side of the plate 46. A threaded collar 88 is electrically connected to terminal 68 and is connected to the mounting strip 66. A threaded bolt 90 which is electrically insulated from the plate 50 by means of a plastic washer 91 located at the top of said collar has a plastic cap 92 at the top end thereof; the bottom end of the bolt 90 projecting downwardly into and through said collar in threaded engagement therewith. The bottom end of said bolt 90 is positioned adjacent said terminal 72; the distance between said bottom end and said terminal being adjustably determined by the rotation of said bolt 90.

The positive terminal of the battery 56 is connected to the terminal 72 by means of an electrically insulated wire 73 and the ground terminal of the battery 56 is directly connected to the plate 50. The horn 60 is connected to terminal 76 and the light 64 is connected to the terminal 78 by means of electrically insulated wires 94 and 96, respectively, and the terminal 68 is conected to terminal 80 by means of another electrically insulated wire 98. The horn 60 and light 64 are also electrically connected to plate 50 which in turn is connected to the ground terminal of the battery 56, thereby supplying said horn and said light with a ground connection which completes the circuit from the battery to said horn and said light, when they are activated.

In the operation of the device, when a fish strikes, the handle 22 of the pole 24 will push the member 54 downwardly, thereby pivotally moving the plate 50 and causing the bottom end of the threaded bolt 90 to contact the terminal 72 and activate the signalling device 10. In this connection, it is to be noted that switching lever 82 can be pivoted so that it will contact either terminal 76 or 78, or both, thereby energizing the horn, the light, or both. Therefore, when the bottom end of the bolt 90 comes in contact with terminal 72, as hereinbefore discussed, the fish strike signalling device will emit either a visual signal, an audible signal, or both an audible and a visual signal.

It is to be noted that the spring 87, in conjunction with the threaded shank 84 and the nut 86 made of an electrically non-conductive material, adjustably biases the pivotal plate 50. This feature, in conjunction with the adjustability of the threaded bolt 90, as hereinbefore discussed, enables the signalling device to compensate for currents, tides and winds, so that no signal will be emitted solely because of the effect of the aforementioned envionmental conditions. This is accomplished by allowing either the light or horn to be activated and then turning the nut 86 or the cap 92, or both, until the horn or light is deactivated; said cap being made of an electrically non-conductive material. Therefore, if the signal device is thereafter activated, it will be due to a fish strike on the line 28.

As seen in FIGURE 2, the prong 16 of the spike 12 threadedly engages the bottom of the tubular portion 14 of said spike and is secured therein by means of a set screw 17. However, when the signalling device of the present invention is to be employed while fishing from a pier, other means are required to secure the device to said pier. This is accomplished by the clamp 110, illustrated by FIGURE 4. The clamp has a threaded shank 112 projecting upwardly therefrom. The shank 112 is engaged by the threaded bore 19 in the tubular portion 14 and is secured therein by the set screw 17, thereby enabling the signalling device to be secured to the pier by means of the clamp 110.

It is therefore seen that the present invention provides a fish strike signalling device which is adjustable to compensate for environmental factors which would normally tend to render the device ineffective.

It will be obvious to those skilled in the art that many modifications and changes may be made in the present invention without departing from the spirit or scope of the invention as defined by the appended claims.

What is claimed is:

1. A fish strike signalling device comprising, a stake which is inserted into the earth and which has a tubular portion at one end thereof adapted to loosely receive a fishing rod handle, a fish strike signal including a housing, said housing being mounted directly on said tubular portion, said signal also including an electrical energy source carried within said housing, signal means, and actuating means adapted to activate said signal means by connecting said electrical energy source across said signal means; said actuating means including a movable member positioned above and directly over the top of said tubular portion in abutting relationship with said fishing rod handle, whereby a fish strike causes movement of said handle and said movable member, concomitantly therewith, causing said actuating means to connect said electrical energy source across said signal means, thereby activating the same.

2. A fish strike signalling device in accordance with claim 1, wherein said signal means comprises an audible signal and a visual signal.

3. A fish strike signalling device in accordance with claim 2, including selective switch means connected to said actuating means to selectively actuate said audible signal, said visual signal or both of said signals simultaneously.

4. A fish strike signal in accordance with claim 3 wherein, said actuating means include adjustment means to compensate for variations in current, tide, wind and the size of fish, whereby the signal means will be actuated only by an actual fish strike.

5. A fish strike signalling device in accordance with claim 3, including anti-tilt means connected to said stake to prevent said signalling device from tilting and falling upon the earth, thereby rendering said signalling device inoperative.

6. A fish strike signalling device in accordance with claim 1 wherein, said actuating means include adjustment means to compensate for variations in current, tide, wind and the size of fish, whereby the signal means will be actuated only by an actual fish strike.

7. A fish strike signalling device in accordance with claim 6, including anti-tilt means connected to said stake to prevent said signalling device from tilting and falling upon the earth, thereby rendering said signalling device inoperative.

8. A fish strike signalling device in accordance with claim 1, including anti-tilt means connected to said stake to prevent said signalling device from tilting and falling upon the earth, thereby rendering said signalling device inoperative.

References Cited by the Examiner

UNITED STATES PATENTS

| | | | |
|---|---|---|---|
| 2,809,459 | 10/1957 | Banks | 43—17 |
| 2,908,099 | 10/1959 | Burke | 43—16 |
| 2,909,860 | 10/1959 | Braun | 43—17 |
| 2,922,243 | 1/1960 | Weaver et al. | 43—17 |
| 3,010,239 | 11/1961 | Johnson | 43—17 |

SAMUEL KOREN, *Primary Examiner.*

RAYMOND L. HOLLISTER, *Assistant Examiner.*